(12) United States Patent
DiMarco

(10) Patent No.: US 6,643,369 B1
(45) Date of Patent: Nov. 4, 2003

(54) CUSTOM TELEPHONE

(76) Inventor: Anthony F. DiMarco, 37490 Hunters Ridge, Solon, OH (US) 44139

(*) Notice: Subject to any disclaimer, the term of this patent is extended or adjusted under 35 U.S.C. 154(b) by 0 days.

(21) Appl. No.: 09/418,433

(22) Filed: Oct. 14, 1999

Related U.S. Application Data

(60) Provisional application No. 60/115,445, filed on Jan. 8, 1999.

(51) Int. Cl.[7] .............................. H04M 1/00; H04M 3/00
(52) U.S. Cl. .................. 379/352; 379/199; 379/355.08; 379/357.05
(58) Field of Search .............................. 379/199, 200, 379/350, 352, 355.02, 355.05, 355.06, 355.07, 355.08, 355.09, 356.01, 357.04, 357.05; 455/564, 565

(56) References Cited

U.S. PATENT DOCUMENTS

| | | | | |
|---|---|---|---|---|
| 5,099,512 A | | 3/1992 | Shigami et al. | 379/357 |
| 5,136,637 A | | 8/1992 | Rust et al. | 379/356 |
| 5,157,719 A | | 10/1992 | Waldman | 379/356 |
| 5,475,743 A | * | 12/1995 | Nixon et al. | 379/355.07 |
| 5,550,915 A | | 8/1996 | Partridge, III | 379/355 |
| 5,719,931 A | | 2/1998 | Johnson | 379/356 |
| 5,859,896 A | * | 1/1999 | Rosen | 379/350 |
| 5,859,901 A | * | 1/1999 | Brendzel et al. | 379/121.01 |
| 6,169,799 B1 | * | 1/2001 | McIntosh | 379/355.01 |
| 6,292,557 B1 | * | 9/2001 | Gabara | 379/355.08 |
| 6,567,675 B1 | * | 5/2003 | Rosen et al. | 455/564 |

* cited by examiner

*Primary Examiner*—Binh Tieu
(74) *Attorney, Agent, or Firm*—Fay, Sharpe, Fagan, Minnich & McKee, LLP

(57) ABSTRACT

A custom telephone apparatus and a method of manufacturing same are provided. In addition to conventional telephone features, the custom telephone includes a memory that is permanently pre-programmed with one or more area codes according to a particular geographic region or as requested by a particular user. The telephone includes permanently labeled area code selector switches or buttons that, when depressed by a user, cause the telephone to dial the area code and any required leading "1" or other digits as a prefix to the telephone number entered by the user by way of a conventional key pad. Thus, the user need only depress a single button to dial "1" plus the area code before a telephone number is entered into the telephone. The memory can also be permanently programmed with one or more complete custom telephone numbers as specified in advance by a particular user. The telephone includes permanently labeled custom telephone switches or buttons that, when depressed by a user, cause the telephone to dial the stored custom telephone number. The telephone is truly custom in the sense that it is manufactured for a particular geographic region and/or for a particular user according to specifications provided in advance. A user need not program the telephone, and cannot alter the permanently programmed area codes or custom telephone numbers without returning the telephone for service.

7 Claims, 3 Drawing Sheets

CUSTOM TELEPHONE

CROSS-REFERENCE TO RELATED APPLICATION

This application claims priority from U.S. Provisional Application No. 60/115,445 filed Jan. 8, 1999, and the same is hereby expressly incorporated by reference herein.

BACKGROUND OF THE INVENTION

This present invention relates the art of telecommunications, more particularly, to a truly custom telephone.

Telephones are presently available with user-programmable button for speed-dialing purposes. A user first must program an available button to be associated with a telephone number. Then, anytime the user depresses the button, the user-programmed number is dialed without further keypad entries by the user. A drawback to these systems is that the user must program the phone to associate a telephone number with a speed-dial button. Many users are unable or unwilling to program the telephone in this manner, and simply do not use the speed-dial button. Another drawback with telephones including user-programmed speed-dial buttons is that the user must either label the button or generate a separate list in order to remember which button is associated with a particular telephone number. Often, the users do-not label the buttons, and a separate list of speed-dial buttons is inconvenient and may become lost. Clearly, many drawbacks are associated with conventional telephones including user-programmable speed-dial buttons.

Conventional telephones have other deficiencies. Traditionally, people have been able to dial within their own city or region-using a seven digit number without having to always enter "1" plus a ### area code, where # is a digit in the range of 0–9. The advance in technology in the telecommunications field has brought about an drastic increase in the number of people who feel that it is a necessity, or nice luxury, to have a phone, cellular phone, pager, direct Internet line, facsimile, etc. This increase in users has brought about a shortage of seven digit phone numbers in most major cities due to the fact that there is a finite number of seven digit phone numbers available. Therefore, it has been decided to alleviate this problem by-assigning various area codes in the same city/region and making people dial 1 +an area code before at least some calls. This need to dial an area code becomes frustrating, tiresome, and inefficient. The use of area codes is also undesirable, especially if the phone number is mis-dialed. To overcome this problem, this invention sets forth a keypad system for a telecommunications systems which allows a user to depress an area code selector button which sends a signal with a preset "1" +an area code (for example, 1 +###) to the phone circuit as a prefix, so that one or more calls may be made using only a mere seven digit number within the area code corresponding to the selected area code selector button. Therefore, the user would only have to depress one button to dial the 1 +area code prefix, and could then dial the desired seven-digit number, helping make their calling quicker and more efficient.

Unfortunately, known systems do not provide for a telecommunication system with a keypad which allows a user to select one of a plurality of preset area code selector buttons for a city/region which has multiple area codes which must be dialed before the seven digit number can be dialed for outgoing calls. The present invention contemplates a new and improved apparatus and method that overcomes the above-referenced problems and others while providing superior results overall.

SUMMARY OF THE INVENTION

In accordance with the present invention, a method of manufacturing a custom telephone for a user before the user has access to the telephone is provided. The method comprises providing a programmable telephone, determining a geographic location in which the telephone is to be used, and determining at least one telephone area code in use in the determined geographic area. For each area code determined to be in use in the determined geographic area, the method includes: (a)programming a memory of the telephone with the area code (which may be defined by a leading "1" plus a three digit code); (b) associating a user-activatable area code selector button on the telephone with the area code programmed in the memory whereby, upon a user selecting the area code selector button, the area code programmed in the memory and associated with the area code selector button is automatically dialed as a prefix to a telephone number dialed by a user using a key pad of the telephone; and, (c) placing area code indicia on the area code selector button indicative of the area code associated with the button.

In accordance with another aspect of the present invention, a custom telephone comprises a processor; a memory operatively connected to the processor that is permanently programmed with at least one area code from a geographic area in which said telephone is to be used; an analog circuit adapted for being connected to an external telephone line; a key paid operatively connected to the processor and adapted for receiving numeric input from a user of the telephone; a DTMF generator operatively coupled between the processor and the analog circuit, the processor adapted for controlling the DTMF circuit to place select DTMF signals on the external telephone line; a handset operatively connected to the analog circuit and adapted for input and input of voice sounds; a switch hook connected to the processor and adapted for detecting when the handset is in use; at least one user-activatable area code selector switch respectively associated with the at least one area code permanently programmed in the memory and operatively connected to the processor whereby, upon a user activating the at least one area code selector switch, the processor accesses said memory to retrieve the associated at least one permanently programmed area code and controls said DTMF generator to output the area code to the analog circuit, with or without a leading "1" digit.

One advantage of the present invention is that it provides a telephone that is truly customized during its manufacture for a particular user and/or for a particular geographic location.

Another advantage of the present invention resides in the provision of a telephone with a keypad is provided with preset area code buttons allowing for quicker and more efficient dialing of numbers requiring an area code.

Still another advantage of the invention is found in the provision of a telephone that includes at least one custom dial button, wherein the telephone has been programmed during its manufacture to dial a specified telephone number when the custom dial button is depressed by an end-user, and wherein the custom dial button is labeled during manufacture of the telephone with indicia as specified by an end-user.

Yet another advantage of the present invention resides in the provision of a new and improved method for manufacturing a telephone that is customized during its manufacture for a particular user located at a select geographic location.

Still other benefits and advantage of the present invention will become apparent to those of ordinary skill in the art to which the invention pertains upon reading and understanding the following specification.

BRIEF DESCRIPTION OF THE DRAWINGS

The present invention may take form in various components and arrangements of components, and in various steps and arrangements of steps, preferred embodiments of which are illustrated in the accompanying drawings wherein.

DETAILED DESCRIPTION OF THE INVENTION

Figure 1:
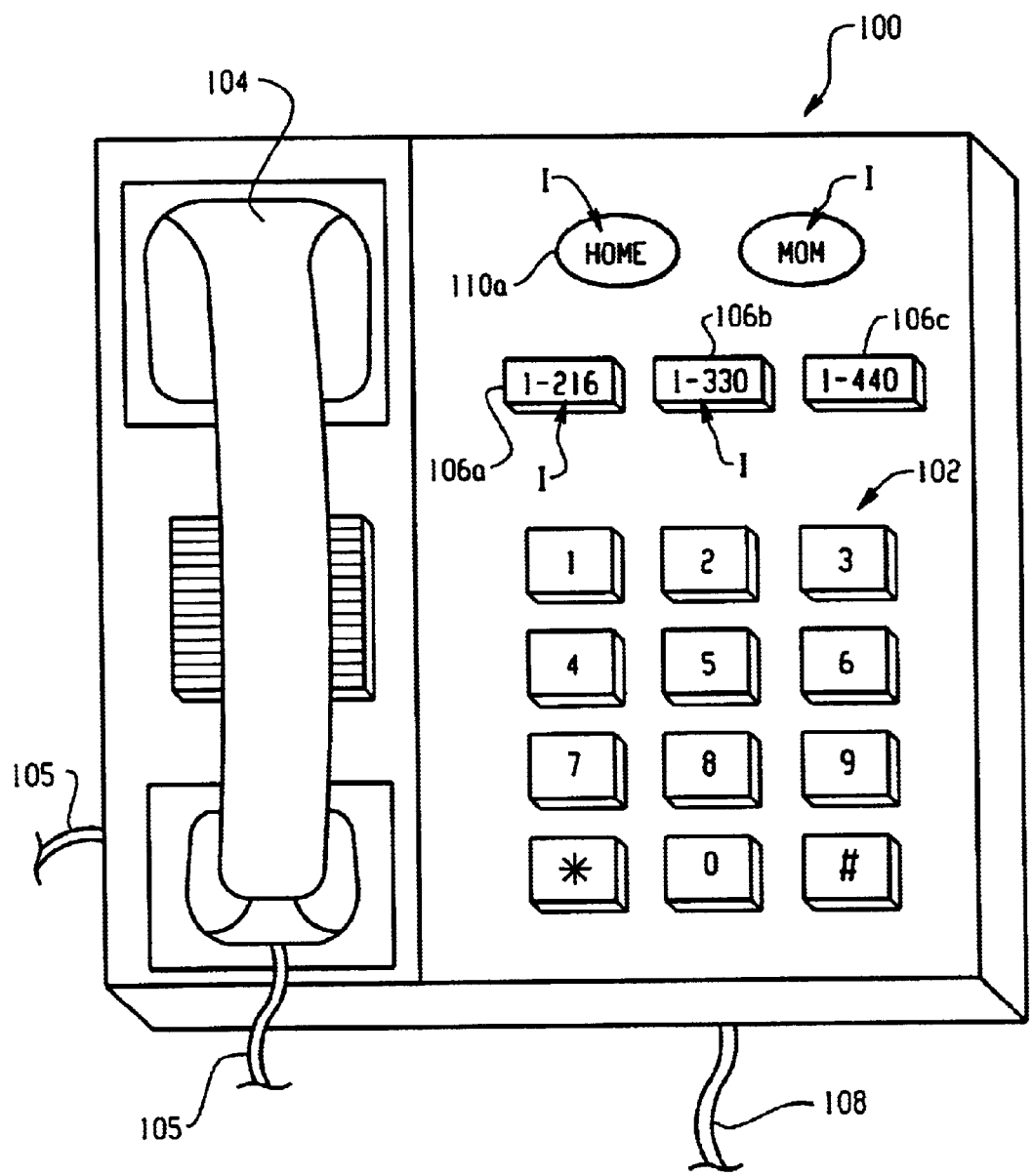
FIG. 1 is illustrates a telephone formed in accordance with the present invention.

FIG. 1 shows an exemplary telephone station set 100, including a standard dialing key pad 102, a standard handset 104 connected to the station set 100 by way of a cord 105 or a wireless connection, and a telephone line 108. Those of ordinary skill in the art will recognize that the telephone station set 100 could also be a programmed computer apparatus.

The telephone station set 100 includes a plurality of area code selector buttons 106a–c. Each button 106a–c is imprinted or otherwise permanently labeled with indicia I indicating an area code associated with the button. By way of example only, each of the area code selector buttons 106a–c is associated with an area code for the city/region of Cleveland, Ohio., U.S.A., and the indicia I denotes the area codes "1-216" "1-330" and "1-440" respectively. It is to be appreciated that the city, and therefore the telephone system 100, may contain more than three area codes. Further, the area codes of any city, state, or other region in the country which has multiple area codes for dialing is also contemplated within the invention. The term "area code" as used herein is intended to encompass a sequence of one or more telephone number digits associated with a particular geographic region that must be dialed as a prefix to a local telephone number in order to place a telephone call to that local telephone number. Although it is shown that the area code selector buttons are located above the dialing key pad 102 they may be located at any other convenient location on the telephone system. It may be appreciated that the area code selector buttons 106a–c may be any form of switch and need not be the mechanical or electrical buttons as shown.

Typically, a telephone station set 100 will be manufactured and permanently customized for a particular city, region, and/or state, so that, when purchased by a user in that city or region, the area code selector buttons 106a–c are preprogrammed for each area code in the user's calling area. However, in certain instances, users may desire to purchase a telephone set 100 including area code selector buttons 106a–c programmed to dial one or more area codes of a different city. For example, a business person in New York who frequently calls Los Angeles, California may wish to purchase a telephone set 100 having all of the area codes of Los Angeles, Calif. associated with the area code selector buttons 106a–c, respectively. In such case, the telephone set 100 would likely have up to six area code selector buttons corresponding respectively to the 805, 818, 310, 213, 714, and 909 area codes.

The telephone station set 100 also comprises one or more custom dial buttons such as the two custom dial buttons 110a,110b illustrated in FIG. 1. As is described in more detail below, during manufacture of the telephone station set 100, each custom dial button 110a,110b is permanently associated with a full telephone number so that, upon a user depressing one of the custom dial buttons 110a,110 the associated telephone number is dialed automatically by the telephone station set 100 without the user operating the dialing key pad 102. Again, the buttons 110a,110b are imprinted or otherwise permanently labeled with indicia I during manufacture of the telephone station set 100 and as specifically requested by a particular user so that the user is always able to ascertain which telephone number is permanently associated with a custom dial button 110a,110b. By way of example only, the buttons 110a,110b include the indicia "HOME" and "MOM" so that a user could call his/her home or his/her mother simply by depressing the appropriate custom dial button 110a,110b. Of course, the buttons 110a,110b can contain any other indicia I as specified by a user prior to manufacture of the telephone station set 100.

Figure 2:
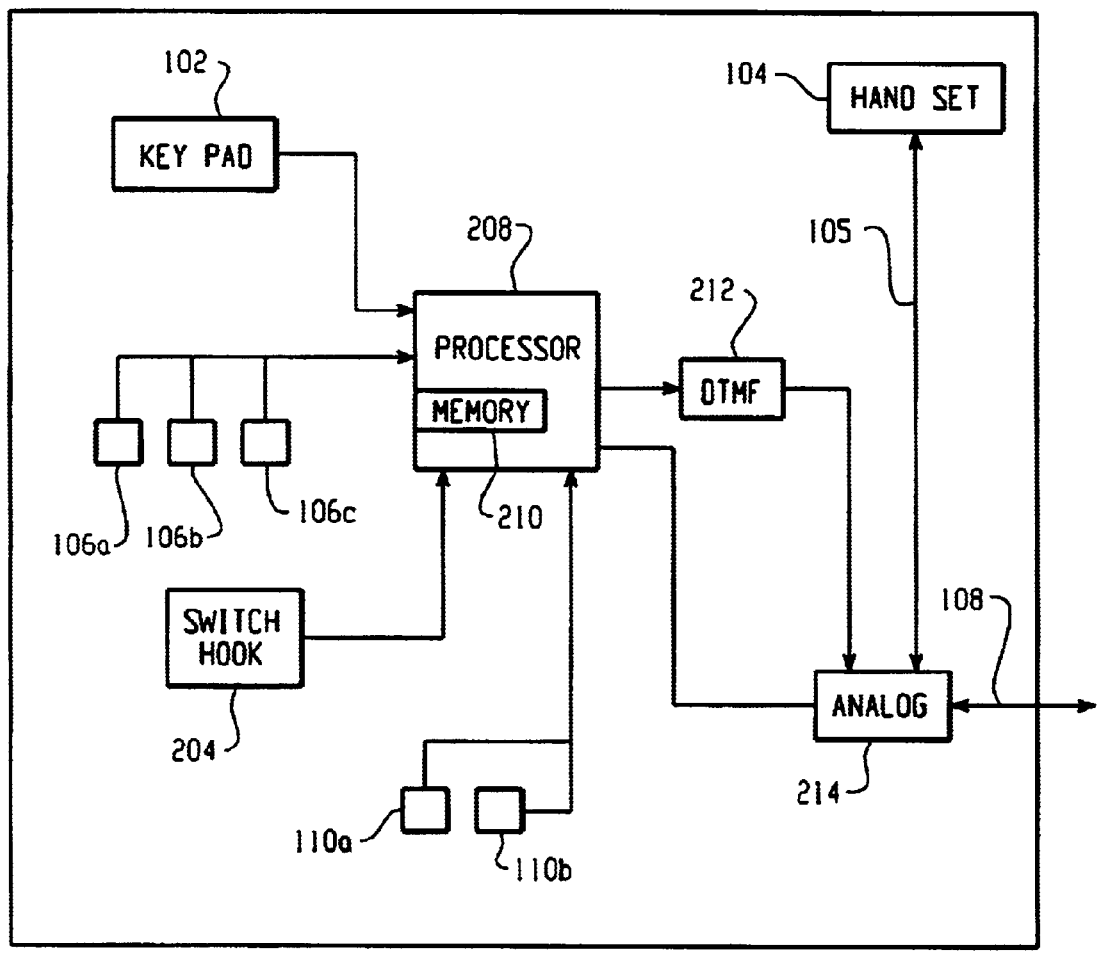
FIG. 2 is a block diagram of the internal circuitry of the telephone shown in FIG. 1; and, FIG. 3 is a flow-chart showing operation of the telephone circuitry of FIG. 2.

Turning now also to FIG. 2, a schematic diagram of the circuitry inside the telephone station set 100 of the present invention is shown. Except for operation of the area code buttons 106a–c and the custom dial buttons 110a,110b, the telephone station set 100 is entirely conventional and will not be discussed in detail. A processor 208, such as any suitable microprocessor/microcontroller, controls all operations of the telephone station set 100. The keypad 102 is operatively connected to the microprocessor so that numbers entered by a user via the key pad 102 are dialed by the telephone station set 100. A switch hook 204 senses whether the handset 104 has been lifted (or if the telephone station set has otherwise been activated) to take the telephone station set 100 "off-the-hook" —i.e., in a condition to place a telephone call. Memory 210 is provided and operatively connected to the processor. The memory 210 is non-volatile (i.e., it does not lose its contents upon loss of electrical power). A dual-tone multi-frequency (DTMF) generator 212 is controlled by the processor 208 generates the required tones to place a telephone call. The tones are input to a conventional analog telephone circuit 214 that is operatively connected to the telephone line 108 and that controls the flow of signals to and from the telephone line 108, including output of. DTMF signals for dialing a specific number, and also input/output of voice and other communications signals to and from the handset 104.

A telephone station set 100 formed in accordance with the present invention is truly custom made for a specific geographic location and/or for a specific user to particular specifications. The customization can occur at the time the telephone station set 100 is assembled, or may occur at a retail or other location prior to the telephone station set being supplied to a user. In either case, a user is not required, and is completely unable, to program the telephone station set 100 with respect to the area code selector buttons 106a–c and the custom dial buttons 110a,110b. As to the area code selector buttons 106a–c, during manufacture/programming of the telephone 100, each area code button 106a–c is associated with an area code for the geographic location where the telephone 100 is to be used. Of course, these area codes differ for each geographic region, but they are well known and widely available. As noted, the term "area code" is intended to signify a prefix number of one or more digits to be dialed before a telephone number input by a user on the key pad 102 when a button 106a–c is depressed or otherwise activated by a user. The particular area code associated with each button is programmed into the telephone station set memory 210 by way of a computer selectively connected thereto or by way of the key pad 102. The area code programmed into the memory 210 preferably includes a leading "1" digit as is conventional for telephone calls made in the United States of America. Also, buttons 106*a–c* are imprinted or otherwise permanently provided with the indicia I so that a user is able to determine which area code is associated with which button simply by viewing the telephone 100. A user is unable to alter the indicia I. Thus, the area codes associated with the buttons 106*a–c* are permanently programmed into the memory 210, and the indicia I is permanently provided on the buttons 106*a–c*. A user may choose to have the standard area codes for a geographic region associated with the area code selector buttons 106*a–c*, or may choose other frequently dialed area codes to be associated with the buttons 106*a–c* as desired. As used herein, the term "permanent" is intended to mean something that an end-user of the telephone station set 100 is not able to modify without returning the telephone station set to the manufacturer or an authorized service representative.

In addition to programming the telephone station set 100 so that a pre-programmed area code is automatically dialed when one of the area code selector buttons 106*a*–106*c* is selected by a user, the telephone station set is preferably further permanently customized for a particular user. When ordering a telephone station set 100, a user provides the manufacturer or retailer with one or more custom dial telephone numbers—the telephone numbers that the user would like to have associated with the buttons 110*a*,110*b* so that the numbers are dialed automatically when the buttons are depressed, respectively. The manufacturer, retailer, or other party programs the memory 210 with the custom dial telephone numbers supplied by the user prior to supplying the telephone station set 100 to the user. Also, the user selects the indicia I that he/she desires to have permanently imprinted or otherwise placed on the buttons 110*a*,110*b* so that the user is able to ascertain which custom dial telephone number is associated with which button 110*a*,110*b*. Again, the indicia is permanently placed on the buttons 110*a*,110*b* before the user receives the telephone 100, and the user is unable to alter same.

In line with the foregoing, the user receives a telephone station set 100 that is fully customized, both in terms of the area code selector buttons 106*a–c* and the custom dial telephone number buttons 110*a*,110*b*. The user is not required to perform any programming of the telephone 100.

As noted, the system 100 is fully controlled via the processor 208 in which the memory 210 stores the necessary codes and data for the system to function. By way of input from the switch hook 204, the processor 208 determines if the phone is "hung up" or is in the "on" (off-the-hook) state. If the phone is off-the-hook, the processor 208 checks the inputs from the switches 106*a–c*, 110*a*,110*b* to determine if specialized area code or custom dialing in accordance with the present invention is to be carried out. If no buttons 106*a–c*,110*a*, 110*b* are selected, the processor 208 functions in a conventional manner so that a telephone number entered by a user via key pad 102 is dialed by the DTMF generator 212 and the analog circuit 214. On the other hand, if one of the area code selector buttons 106*a–c* has been pressed or otherwise selected by a user, the processor 208 accesses the memory 210 and determines which area code is associated with the depressed button and controls the DTMF generator 212 accordingly to generate the required area code tones and to supply same to the analog circuit 214. Of course, the analog circuit 214 controls the overall connection of the telephone station set 100 to the telephone line 108 for sending the DTMF tones and also controls the flow of signals from and to the handset 104 as required for communication. Likewise, if a user has depressed one of the custom dial buttons 110*a*,110*b*, the processor will sense same, access the memory to determine the telephone number associated with the depressed custom dial button 110*a*,110*b*, and controls the DTMF generator 212 accordingly so that the stored number is dialed without further input from the user of the telephone station set 100.

Figure 3:
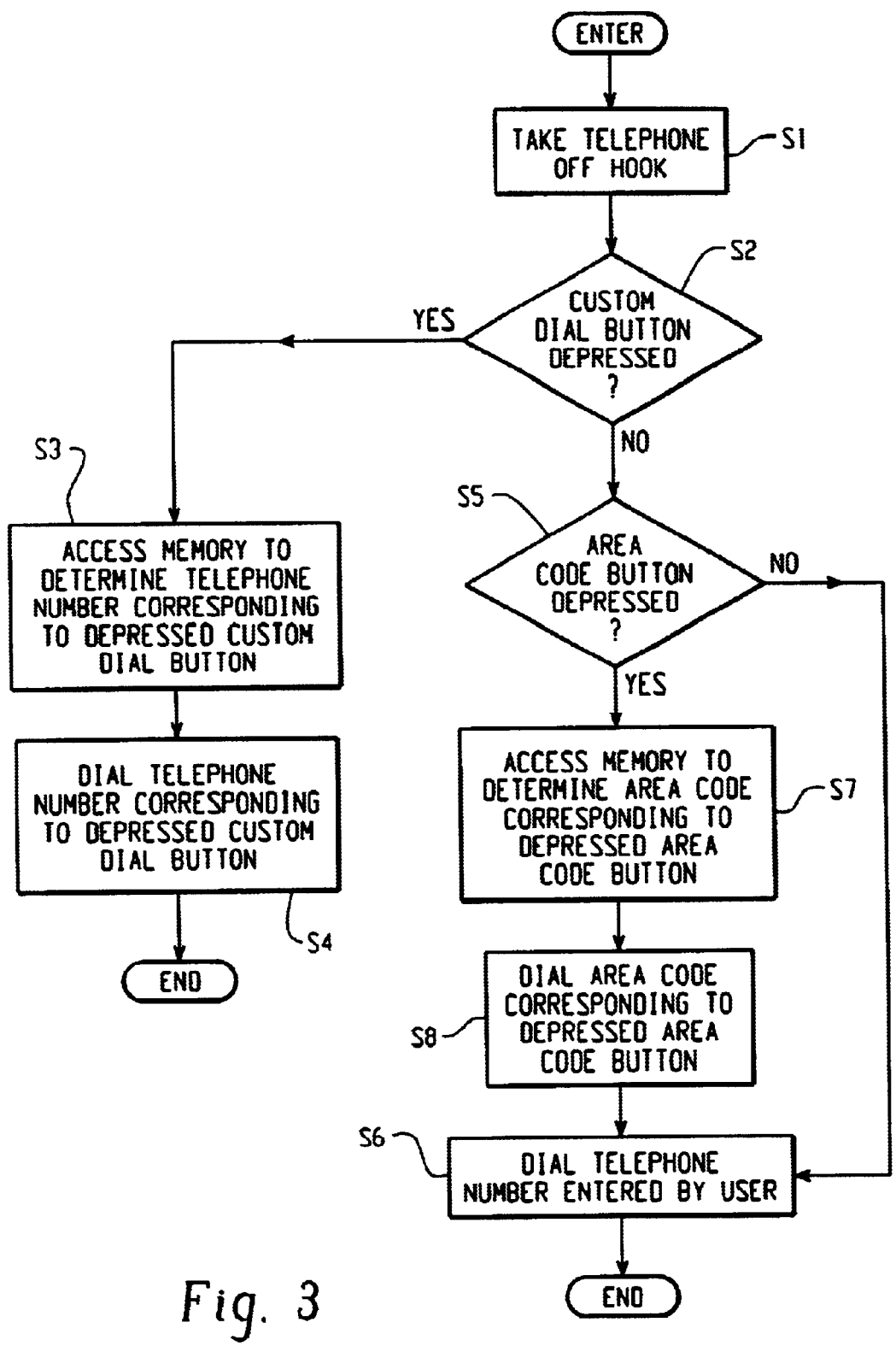

FIG. 3 illustrates the foregoing in flow-chart form after the user takes the telephone station set off the hook in a step S1 for purposes of placing a telephone call. A step or means S2 determines if one of the custom dial buttons 110*a*,110*b* is depressed or otherwise selected by the user. If a custom dial button 110*a*,110*b* has been selected by the user, a step or means S3 accesses the memory 210 and obtains the custom telephone number stored in memory 210 and associated with the particular button 110*a*,110*b* selected by the user. A step or means S4 dials the telephone number retrieved by the step or means S3.

On the other hand, if the step or means S2 determines that none of the custom dial buttons 110*a*,110*b* has been selected by the user, a step or means S5 determines if one of the area code buttons 106*a–c* has been depressed or otherwise selected by the user. If not, control passes to a step or means S6 that simply causes the telephone number entered by the user via key pad 102 to be dialed in a conventional manner. However, if one of the area code selector buttons 106*a–c* has been selected by the user, a step or means S7 accesses the memory 210 and retrieves the previously stored area code information associated with the particular button 106*a–c* that has been depressed. Then, a step or means S8 causes the area code retrieved by the step or means S7 to be dialed. Control then passes to the step or means S6 that dials any further numbers as input by the user on the key pad 102 in a conventional manner.

Those of ordinary skill in the art will recognize that an area code need not always include an initial "1" digit. Instead, if desired and appropriate, the memory 210 can be programmed so that when one of the buttons 106*a–c* is depressed, an area code of three digits or less will be dialed as a prefix to the telephone number entered by a user via keypad 102. Again, it is intended that the term "area code" encompass either arrangement—with or with a leading "1."

The invention has been described with reference to preferred embodiments obviously, modifications and alterations will occur to others reading and understanding the preceding detailed description of the preferred embodiments. It is intended that the invention be construed as including all such operations and modifications insofar as a they fall within the scope of the specifications or equivalent thereof.

Having thus described the preferred embodiment, what is claimed is:

1. A method of manufacturing a custom telephone for a user before said user has access to said telephone, said method comprising:
   providing a programmable telephone;
   determining a geographic location in which the telephone is to be used;
   determining at least one telephone area code in use in the determined geographic area;
   for each area code determined to be in use in the determined geographic area:
   (a) programming a memory of said telephone with said area code;
   (b) associating a user-activatable area code selector button on said telephone with said area code programmed in said memory whereby, upon a user selecting said area code selector button, said area code programmed in said memory and associated with said area code selector button is automatically dialed as at least part of a prefix to a telephone number dialed by a user using a key pad of said telephone; and, (c) placing area code indicia on said area code selector button indicative of said area code associated with said button.

2. The method of manufacturing a custom telephone as set forth in claim 1, wherein said area code indicia is permanently placed on said area code selector button.

3. The method of manufacturing a custom telephone as set forth in claim 1, further comprising:

receiving a custom dial number from a user for whom said telephone is being customized, said custom dial number representing a telephone number;

receiving suggested custom dial indicia associated with said custom dial number from said user;

programming said memory of said telephone with said custom dial number;

associating a user-activatable custom dial button on said telephone with said custom dial number programmed in said memory whereby, upon a user selecting said custom dial button, said custom dial number programmed in said memory and associated with said selected custom dial button is automatically dialed by said telephone; and, placing said custom dial indicia received from said user on said custom dial button.

4. The method of manufacturing a custom telephone as set forth in claim 3, wherein said custom dial indicia is permanently placed on said custom dial button.

5. The method of manufacturing a custom telephone as set forth in claim 1 wherein said step of programming said memory with said area code includes programming said memory with a sequence of four digits to be dialed, wherein a first digit to be dialed is the digit "1."

6. A custom telephone comprising:

a processor;

a memory operatively connected to said processor, said memory permanently programmed with at least one area code from a geographic area in which said telephone is to be used;

an analog circuit adapted for being connected to an external telephone line;

a key paid operatively connected to said processor, said key pad adapted for receiving numeric input-from a user of said telephone;

a DTMF generator operatively coupled between said processor and said analog circuit, said processor adapted for controlling said DTMF circuit to place select DTMF signals on said external telephone line;

a handset operatively connected to said analog circuit, said handset adapted for input and input of voice sounds;

a switch hook connected to said processor and adapted for detecting when said handset is in use;

at least one user-activatable area code selector switch respectively associated with said at least one area code permanently programmed in said memory and operatively connected to said processor whereby, upon a user activating said at least one area code selector switch, said processor accesses said memory to retrieve said associated at least one permanently programmed area code and controls said DTMF generator to output one of: (i) said area code; and, (2) said area code plus a leading "1" digit to said analog circuit.

7. The custom telephone as set forth in claim 6, wherein said memory is further permanently programmed with at least one custom dial number as previously specified by a user, said custom dial number being a complete telephone number, said custom telephone further comprising:

at least one user-activatable custom dial number switch respectively associated with said at least one custom dial number permanently programmed in said memory and operatively connected to said processor whereby, upon a user activating said at least one custom dial number switch, said processor accesses said memory to retrieve the stored custom dial number associated with said at least one custom dial switch activated by said user and controls said DTMF generator to output said retrieved custom dial number to said analog circuit.

* * * * *